UNITED STATES PATENT OFFICE.

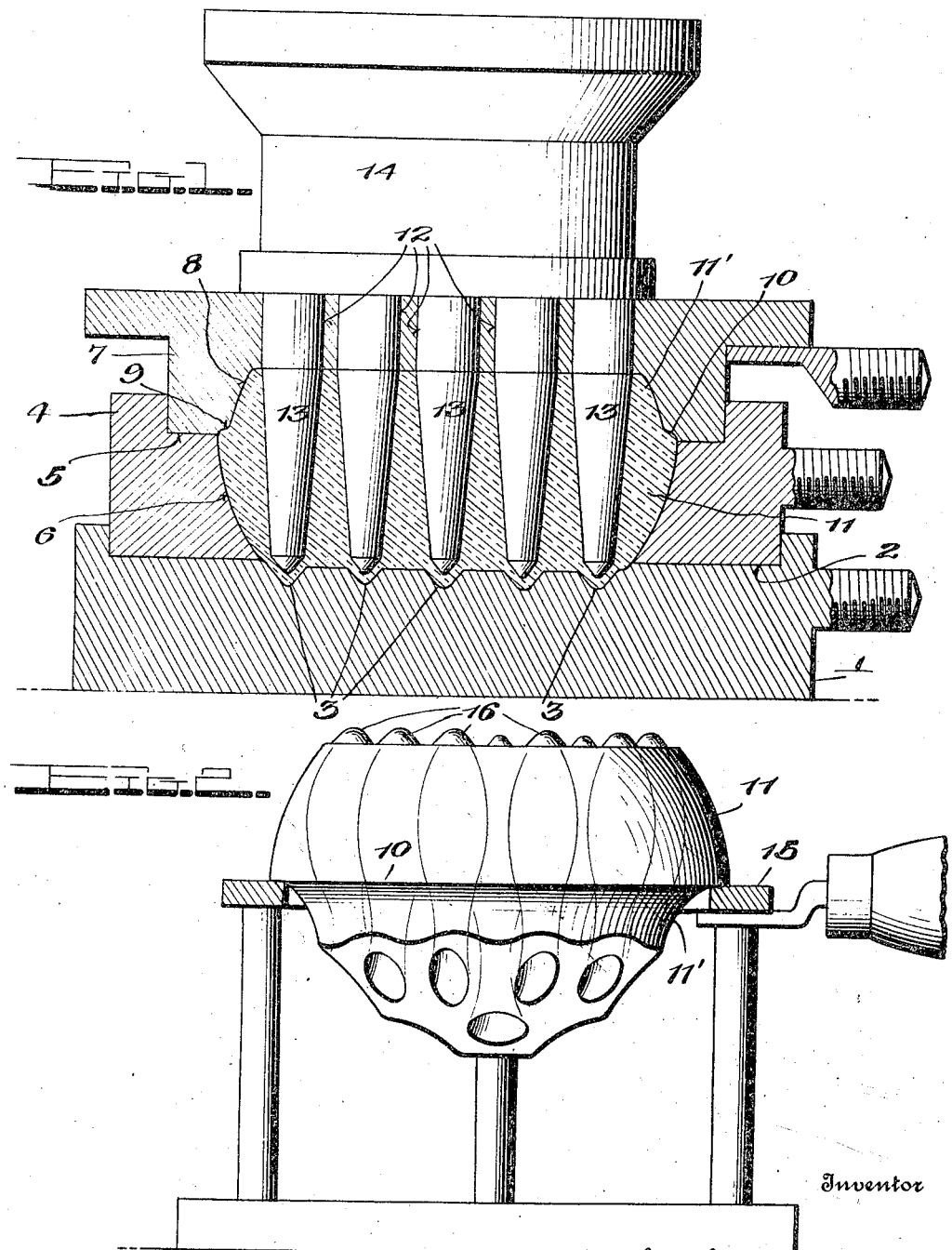

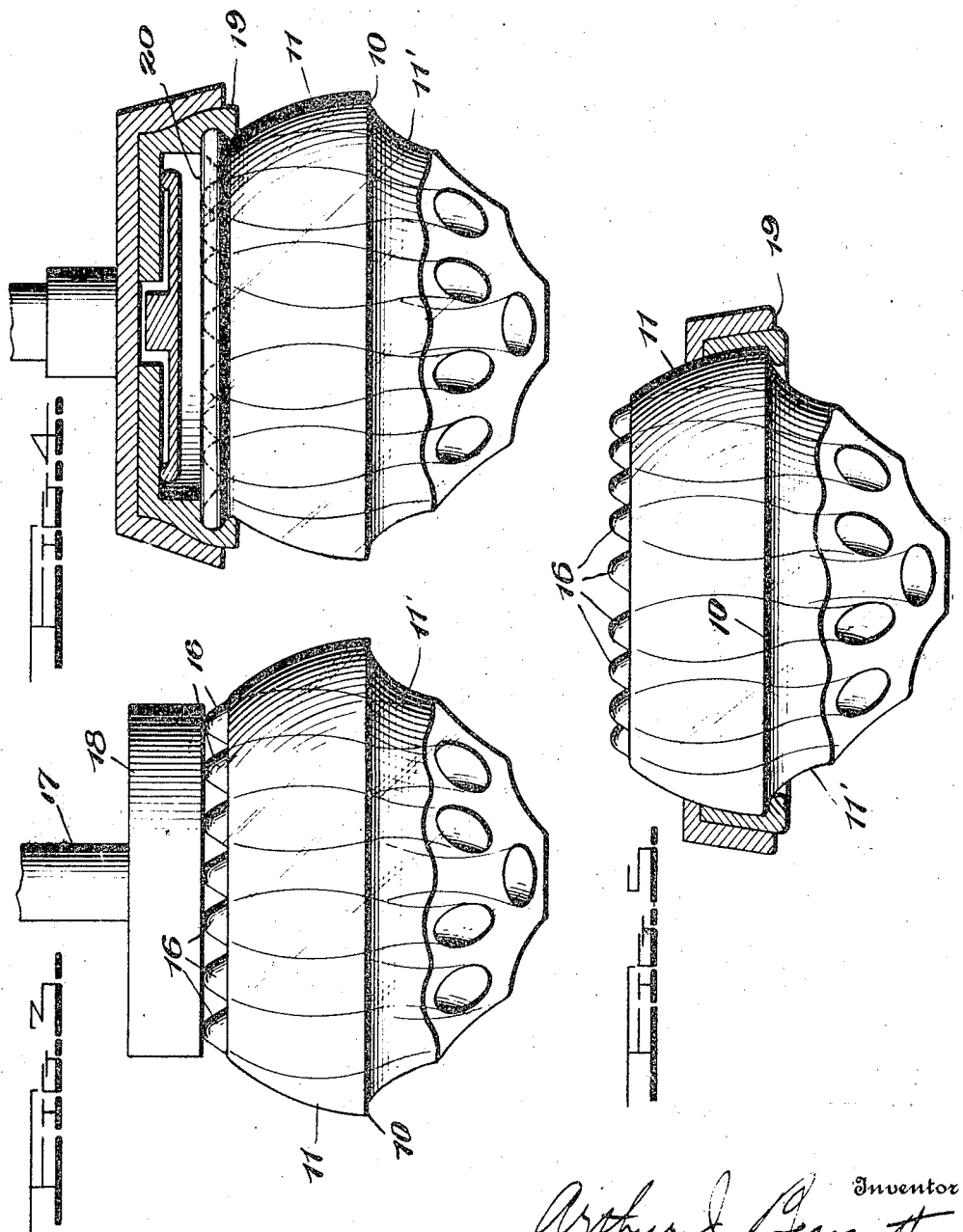

ARTHUR JAMES BENNETT, OF CAMBRIDGE, OHIO.

METHOD OF MAKING FLOWER-HOLDERS.

1,179,155.

Specification of Letters Patent. Patented Apr. 11, 1916.

Application filed June 30, 1915. Serial No. 37,279.

*To all whom it may concern:*

Be it known that I, ARTHUR J. BENNETT, a citizen of the United States, residing at Cambridge, in the county of Guernsey and State of Ohio, have invented new and useful Improvements in Methods of Making Flower-Holders, of which the following is a specification.

This invention relates to new and useful improvements in method of making flower holders, and the primary object of the invention is to provide an improved method for the manufacture of blocks from molten material for holding and supporting flowers.

Briefly, the invention contemplates the placing or pouring of sufficient molten glass into a mold to form a block or holder; inserting a plunger into and through the body, such operation producing small teats or protuberances projecting below the bottom; removing the mold; inverting the body and supporting the same without the use of any mold, to allow the glass which is to form the top to fall or sag from the increased body portion under the influence of its initial heat; and finally removing the protuberances from the bottom of the body to provide openings extending entirely through the body.

A full understanding of the invention will be obtainable from the following description in connection with the accompanying drawings in which:

Figure 1 is a sectional view of a mold with the glass material therein and the plunger inserted for forming the flower stem receiving opening; Fig. 2 is a similar view of a support for holding the glass block in inverted position, the block being in elevation; Figs. 3, 4 and 5, show different methods of supporting the glass block inverted to permit of the top-forming glass to sag and form the top of the block.

The mold employed in the present method preferably consists of three sections and a core or plunger member. The base mold section 1 is recessed, as at 2, and the bottom wall of the recess is provided with a plurality of depressions or indentations 3 which are preferably arranged in concentric series. The intermediate mold section 4 is nested in the recess 2 of base section 1 and is formed in its top wall with a recess 5 from which leads an opening 6 through the section, said opening being disposed to surround or include the depressions 3.

Nested in recess 5 is the top mold section 7 which is formed in its bottom wall with a recess 8 and a counterbore or enlargement 9 to form a shoulder 10 on the block or flower holder 11. Extending through the top section 7 from recess 8 and arranged in coincidence with the depressions 3 is a plurality of openings 12 through which the plungers 13 are inserted. These plungers are supported by a suitable head 14 and are of sufficient length to extend below the bottom wall of recess 2 into the depressions 3, said plungers tapering downwardly from the openings 12. The cross sections of opening 6 and recesses 8 and 9 may be of any desired contour.

The molten glass, or other material, is placed in the sectional mold and the plungers 13 inserted (see Fig. 1) thereby forcing the glass into the recesses 8 and 9 of the top mold section 7 to procure the initial part of the top curvature, or an increased body or superstructure of glass 11'. The block is then removed from the mold and plungers and supported in an inverted position from its shoulder 10 engaging with a ring 15 of a stand as shown in Fig. 2. When inverted, the central portion of the block being still hot will fall or sag into free space, and without the presence of a mold and under the influence of the initial heat from the super or increased body structure into an indefined form of the general contour shown. Due to the sagging or falling of the central mass, the base or, as disposed in Fig. 2, the upper part of block 11 will probably be slightly deformed by contraction at that point and the curvature of the side wall increased. But for the sake of clearness, the finished curvature of the block 11 is shown practically of the same general contour as that of the mold. The small protuberances 16, which are formed by the depressions 3 and made hollow by the plungers 13 entering the latter, are then removed from the bottom of the block by breaking them off to complete the openings entirely through the block.

In lieu of supporting the block inverted by the construction shown in Fig. 2, other methods may be advantageously employed as depicted in Figs. 3, 4 and 5. In Fig. 3, a "punty iron", consisting of a post 17 and iron plate 18, is used which, when hot, will readily adhere to the hot glass protuberances 16 and allow the block to be supported in an inverted position. Fig. 4 shows an automatic flange snap 19 for engaging over a slight projection or foot 20 specially formed on the bottom of the block, or the snap may be conveniently applied to the block shoulder 11 as illustrated in Fig. 5.

Although glass is specifically mentioned herein, it is understood that other similar material may be used with equally as good results. Furthermore, it is not the intention to limit the invention to any particular shape of resultant product, since various and fancy forms are contemplated, such as oval, square, etc.

With use of a punty and snap, the formation of the mold could be changed so as to eliminate the shoulder 10 and continue the curvature into the superbody portion.

In connection with the mold, it will be noted that three sections are not essential, since the two lower sections 1 and 4 may be united or integrally formed to thereby provide a mold comprising two sections.

The above mentioned and other obvious changes are announced as falling within the spirit and scope of the invention as defined by the appended claims.

What is claimed is:

1. The hereindescribed method of making a glass flower-holding block which consists in molding a body with a shoulder and a superbody portion extending from the shoulder, providing a plurality of openings through the superbody portion, and inverting and supporting the block from its shoulder while the superbody portion is in partial molten condition to permit of the latter sagging unsupported into an indefined shape.

2. The hereindescribed method of making a glass flower-holding block which consists in molding a body, providing an opening in the top wall thereof, inverting the body while the central portion is partially molten, and supporting the body at a point above the inverted top wall to allow the partially molten portion sagging from the top wall into an indefined shape.

3. The hereindescribed method of making flower-holding blocks, which consists in placing glass in a mold, forming an opening in the block, removing the mold and inverting the block while the central top portion is still hot to permit of that portion sagging into an indefined shape to complete the top for the block.

4. The hereindescribed method of making flower-holding blocks, which consists in placing glass in a mold having a shoulder-forming recess and a removable part formed with a superbody-forming recess, inserting a plunger into the glass to force the same up into the recess of the mold and provide an opening in the block, removing the part provided with the superbody-forming recess and inverting the block while the central portion of the block is still hot to allow that portion to sag from the superbody part into an indefined shape.

5. The hereindescribed method of making a flower-holding block, which consists in placing glass in a mold having a shoulder-forming recess and a superbody-forming recess, inserting a plunger entirely through the glass block to form a protuberance on the bottom of the block and whereby the material is forced into the recesses of the mold, inverting the block and supporting it by its shoulder while the central top portion of the block is hot to allow that portion to sag, and then removing the protuberance to complete the opening through the block formed by the plunger.

6. The hereindescribed method of making a glass flower-holding block which consists in molding a body with a superbody portion having a flat top, providing openings through the top of the superbody portion, and, while the latter is in a partially molten condition maintained so by the residual heat, inverting the body to allow the superbody portion sagging into space indefined.

In testimony whereof I have hereunto set my hand.

ARTHUR JAMES BENNETT.